United States Patent [19]

Delangis et al.

[11] Patent Number: 5,415,500
[45] Date of Patent: May 16, 1995

[54] METHOD OF DRILLING HOLES IN REINFORCED METAL MATRIX COMPOSITES

[75] Inventors: Leo M. Delangis, Lomita, Calif.; Howard P. Stuart; Richard F. Vyhnal, both of Tulsa, Okla.

[73] Assignee: Rockwell International Corp., Seal Beach, Calif.

[21] Appl. No.: 130,823

[22] Filed: Oct. 4, 1993

[51] Int. Cl.⁶ ............................................. B23B 35/00
[52] U.S. Cl. .............................. 408/1 R; 408/241 R
[58] Field of Search ............................ 408/1 R, 241 R

[56] References Cited

PUBLICATIONS

Tool and Manufacturing Engineers Handbook, Third Edition, Society of Manufacturing Engineers, 1976, Chapter 3, pp. 10–19 and 26–29.

*Primary Examiner*—Daniel W. Howell
*Attorney, Agent, or Firm*—Terrell P. Lewis; Charles T. Silberberg

[57] ABSTRACT

A method and apparatus for forming cleanly defined holes through reinforced metal matrix material includes a drill bit with a shank portion and flutes on said shank portion, the drill bit capable of withstanding a chip load of at least about 0.008 inch/rev/flute, and preferably in the range of from about 0.008 inch/rev/flute to about 0.012 inch/rev/flute, achieved through turning the bit at a speed within the range of about 18 surface feet per minute ("sfpm") to about 20 sfpm, and advancing the bit at an aggressive rate through the metal matrix material at a rate of from about 3 inches per minute to about 6 inches per minute.

4 Claims, 1 Drawing Sheet

U.S. Patent — May 16, 1995 — 5,415,500
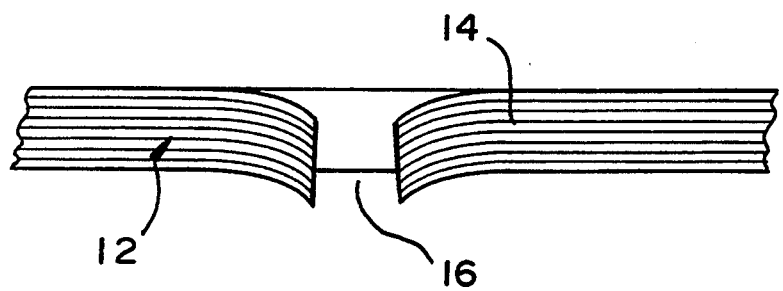
FIG. 1
(PRIOR ART)
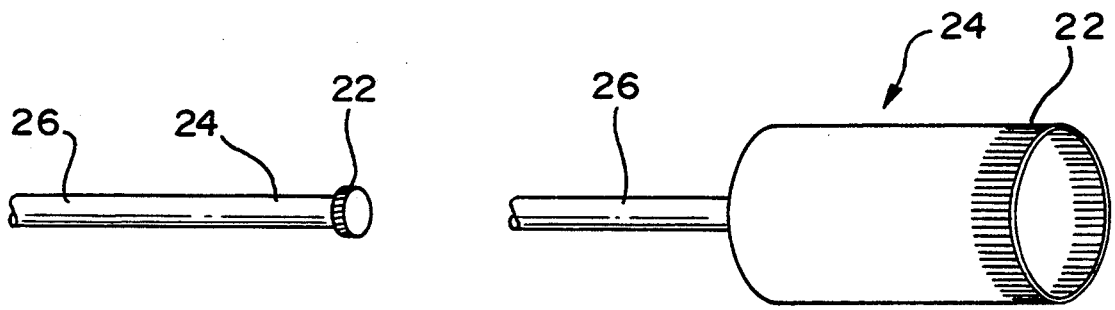
FIG. 2a
(PRIOR ART)
FIG. 2b
(PRIOR ART)
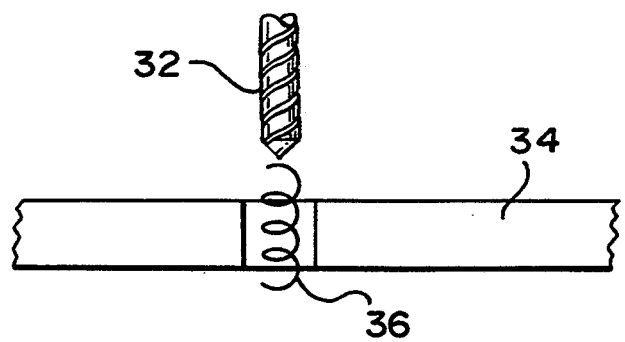
FIG. 3

METHOD OF DRILLING HOLES IN REINFORCED METAL MATRIX COMPOSITES

STATEMENT OF GOVERNMENT INTEREST

This invention was made with Government support under Contract No. F33657-91-2012 awarded by the U.S. Air Force. The Government has certain rights in this invention

BACKGROUND OF THE INVENTION

1. Field of the Invention

The present invention relates to methods for forming holes in reinforced metal matrix composite materials, and more particularly to an economical method for drilling holes through reinforced metal matrix composite materials without drill breakage or loss of dimensional accuracy.

2. Background of the Invention

Today, materials used for advanced design aerospace structures must exhibit exceptional structural strength characteristics, while at the same time permiting significant reduction in overall weight. One class of such materials is reinforced metal matrix composites.

Metal matrix composites are generally comprised of a hard, high-strength reinforcement material distributed within and throughout a softer, more ductile metal or alloy. The reinforced material may be a hard, abrasive ceramic material, such as silicon carbide or aluminum oxide, and may be in the form of powder or particles, short fibers or whiskers, or long continous fibers. The matrix material may be aluminum, copper, titanium or some other metal or alloy.

There are a variety of methods in use today for fabricating metal matrix composites, including casting and infiltration, vapor deposition, solid state diffusion at high temperatures and pressures, etc. The resultant metal matrix composite products, in whatever manner produced, commonly exhibit a similar characteristic, namely the inclusion of a hard, abrasive ceramic phase in a softer metal matrix.

One problem in working with reinforced metal matrix composite materials is how to form holes or openings for receipt of fasteners, principally for the purpose of fastening members together.

One approach to forming holes in reinforced metal matrix material has been to punch through the thickness of the consolidated matrix material. However, this method has been found to be undesirable insofar as the typically soft matrix material 12 tends to deform in the direction of the punch, and the fibers 14 running to the edge of the hole 16 are similarly affected, as shown in FIG. 1 of the drawings.

Another technique used to form such holes has been to drill through the consolidated material at low feed rates and at high rpm using a diamond core drill. These core drills are extremely expensive, and generally perform well only in extremely hard materials, such as ceramics, glass and carbon reinforced epoxies. While the composite reinforcement is hard and brittle, the metal matrix material is much softer, more ductile and prone to galling, which causes excessive heating and deterioration of the diamond core drill. This leads to rapid loss of dimensional accuracy and a resultant, very high, dollar-per-hole cost. In fact, diamond core drill wear occurs so rapidly that the cost per hole often exceeds $45.00.

Another method for drilling in metal matrix materials has been to use conventional drill bits made from hard, wear resistant materials, such as carbide. This method, when using conventional drilling parameters, has resulted in rapid wear or high incidence of breakage of the drill bit.

A process which facilitates the drilling of holes through reinforced metal matrix materials with minimized drill breakage and cost per hole would therefore be most desirable.

OBJECTS AND SUMMARY OF THE INVENTION

It is therefore a principal object of the present invention to provide a novel method for drilling holes in consolidated reinforced metal matrix materials which will overcome all the disadvantages and drawbacks of similar known hole forming processes.

Another object of the present invention is to provide a method for obtaining holes in reinforced composite materials using drilling or reaming apparatus where breaking of the bit and the costs associated with providing the holes is minimized.

These and other objects of the invention are achieved through the use of low cost drill or reamer bits at low rotational speeds and aggressive feed rates, which combination minimizes the length of time that the drill bit is exposed to the abrasive environment, thus reducing the extent of wear and thereby maintaining dimensional accuracy of the hole.

BRIEF DESCRIPTION OF THE DRAWINGS

FIG. 1 illustrates a hole formed in a reinforced metal matrix material in accordance with a known punching technique;

FIGS. 2a and 2b illustrate two embodiments of diamond core drills currently in use; and FIG. 3 shows a drill bit of the type which is used in performing the method of the present invention.

DETAILED DESCRIPTION OF THE INVENTION

FIGS. 2a and 2b illustrate two embodiments of conventional diamond dusted core drills. As shown, the diamond bits 22 are secured to a support portion 24, which in turn is mounted on a drill shank 26. The support portion of FIG. 2a is an extension of the shank 26, while in FIG. 2b, the support portion is a cylinder. In both embodiments, the diamond chips or dust has been secured to the outer surface of the support portion.

FIG. 3 shows a drill bit 32 of substantially conventional design, which is disposed above a hole that was formed In a metal matrix composite member 34. Helical line 36 In the hole schematically depicts the path of a point on the drill bit as the drill bit cuts through the composite member 34.

One conventional industry approach to producing holes in reinforced titanium matrix composite material has been to use diamond dusted core drills of the type shown in FIGS. 2a and 2b. Another has been to use a drill bit of the type shown in FIG. 3. In either case, the drills or bits are run at relatively high rates of surface feet per minute and revolutions per minute, and typically employ a peck drilling cycle in which a low feed rate is imparted to the core drill.

This approach to drilling holes has proven to be extremely expensive and cumbersome due to the excessive wear of the core drill and the time-consuming slow feed rate of the peck drill cycle. Accurate hole size is also difficult to maintain, and typically requires a second operation to maintain the desired hole diameter.

Furthermore, dimensional control of the hole size is extremely difficult due to the method of producing hole using conventional drill bits, applicants invention yielded tool cost/hole values of from about $5 for low-tolerance ¼ inch diameter holes to about $17 for close-tolerance drilled and reamed 0.377 inch, and 0.406 inch, diameter holes.

TABLE I

| (2) | Drill Diam | # Drills Used | Original Cost/drill | Resharpening Cost/drill* | Total Drill Cost | |
|---|---|---|---|---|---|---|
| 0.377" φ Holes | 0.250 | 18 | 16.18 | 24.00 | 723.24 | |
|  | 0.368 | 13 | 33.28 | 24.00 | 744.64 | |
|  | 0.377 ream | 13 | 48.96 | 24.00 | 948.46 | |
|  |  |  |  |  | $\frac{2416.34}{140 \text{ holes}}$ | = $17.26/hole |
| 0.406" φ Holes | 0.250 | 6 | 16.18 | 24.00 | 241.08 | |
|  | 0.390 | 5 | 36.22 | 24.00 | 301.10 | |
|  | 0.406 ream | 5 | 30.75 | 24.00 | 273.75 | |
|  |  |  |  |  | $\frac{815.93}{48 \text{ holes}}$ | = $17.00/hole |
| ¼-pilot holes | 0.250 | 24 | 16.18 | 24.00 | $\frac{964.32}{188 \text{ holes}}$ | = $5.13/hole |

*Based on 24 hrs of resharpening
@ $60/hour = $1440 for 2 resharpenings for each of 60 drills and reamers.

diamond core drills. Diamond chips are normally plated on, or bonded to, the support portion of the drill. Diamond chips typically have many different shapes and sizes, and no single, uniform diameter is obtained while the core drill rotates. The larger diamond chips will contact more material and produce a larger diameter until they are broken out of the matrix material which holds them in place. Moreover, the relatively softer matrix material will gall and build up in the spaces between the diamond chips, generating excessive heat and thereby accelerating wear.

The method of the present invention solves these problems by using a conventional drill bit, made of a hard, abrasion resistant material (such as a carbide material), which is operated at an rpm lower than the rpm currently practiced for drilling of holes in reinforced metal matrix materials, at an aggressive feed rate, and under conditions of rotational speed and forward travel so as to achieves a "chip load" of at least about 0.008 inch/rev/flute, and preferably within the range of from about 0.008 inch/rev/flute to about 0.012 inch/rev/flute. "Chip load" is a term of art which connotes the amount of penetration per bit flute on each revolution of the bit.

In accordance with the teachings of the present invention, achieving this chip load is accomplished by advancing the bit with an aggressive feed rate (in the range of from about 3 ipm to about 6 pm) and at a low rpm (in the range of from about 18 surface feet per minute to 20 surface feet per minute). The chip load of a bit is determined from the following equation:

$$\text{chip load} = \frac{.262 * D * \text{inches per minute}}{N * \text{sfpm}},$$

For sfpm values above the range of from about 18–20, the wear rate of the bit cutting edges increases, while for sfpm values below this range, the risk of bit breakage increase. A two-flute drill having a shallow (15°) helix angle and a split point with a 135° angle is preferred for this application. Drills having greater numbers of flutes are not as desirable, since, in such cases, the cross-sectional area is reduced, thereby increasing the risk of drill breakage.

Table I presented below illustrates the cost savings obtained using a drill bit according to the present invention. In particular, and in contrast to the $45 cost per hole using conventional drill bits, applicants invention yielded tool cost/hole values of from about $5 for low-tolerance ¼ inch diameter holes to about $17 for close-tolerance drilled and reamed 0.377 inch, and 0.406 inch, diameter holes.

In the conventional method, drill bits are used to wear down and ultimately disintegrate the reinforcing materials in the reinforced matrix material. The slow feed rates, coupled with the small chip load, hamper the action of the bits to break through the reinforcing materials, instead promoting heating, and subsequent sticking, of the bit to the matrix.

In contrast, in the present invention, the combined effect of the heavy chip load reflected in the distance penetrated during one revolution) and the aggressive feed rate enables the bits to break or cut through the reinforcing materials by biting into and shearing through them, as for example in the case of fiber reinforcing materials.

While certain representative embodiments and details have been shown for the purpose of illustrating the invention, it will be apparent to those skilled in this art that various changes and modifications may be made therein without departing from the spirit or scope of this invention.

What we claim is:

1. A method for forming holes in a reinforced titanium matrix composite material, comprising:
   providing a conventional drill bit having at least two flutes, and
   operating said drill bit so as to achieve a chip load of at least 0.008 inch/rev/flute.

2. The method of claim 1, wherein said chip load is achieved by
   turning said bit at a speed within the range of substantially 18 sfpm to 20 sfpm, and
   advancing said bit through said reinforced titanium matrix composite material at feed rate of at least 3 inches per minute.

3. A method for forming holes through a reinforced titanium matrix composite material, comprising:
   operating a drill bit to achieve a chip load which is in the range of from 0.008 inch/rev/flute to 0.012 inch/rev/flute, and
   advancing said drill bit at a feed rate through said matrix material of from about 3 inches per minute to about 6 inches per minute.

4. The method of claim 2, wherein said feed rate is within the range of from about 3 inches per minute to about 6 inches per minute.

* * * * *